No. 800,001. PATENTED SEPT. 19, 1905.
O. MILLER.
FISHING GEAR.
APPLICATION FILED NOV. 3, 1904.
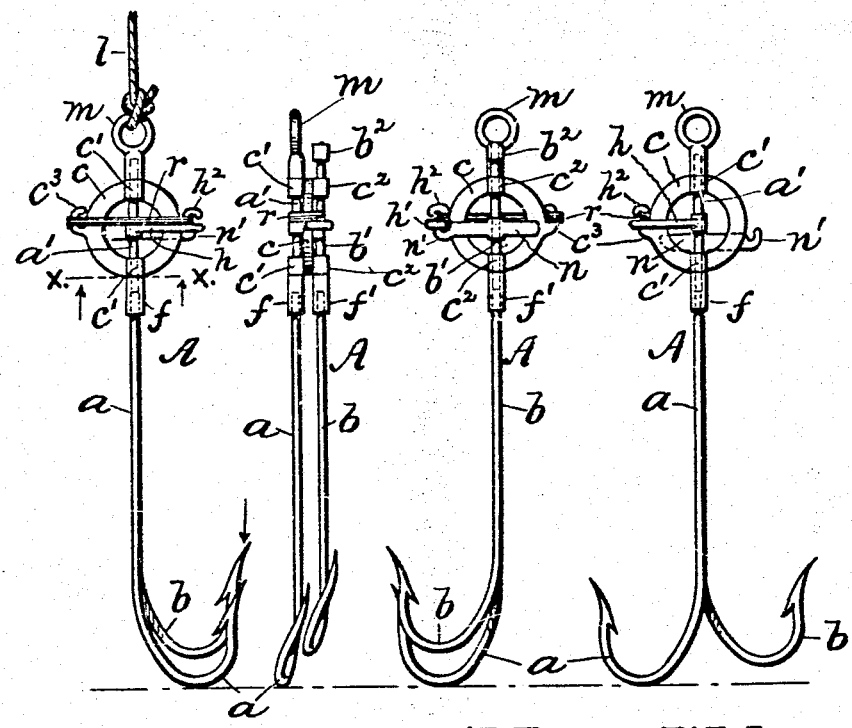
FIG.1. FIG.2. FIG.3. FIG.4.
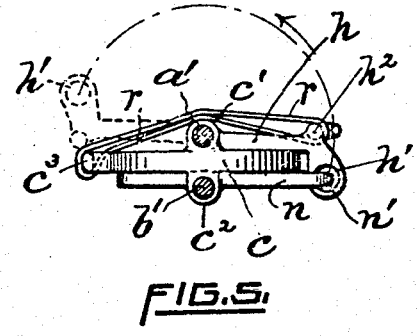 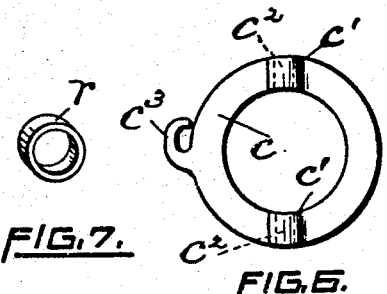
FIG.5. FIG.7. FIG.6.
WITNESSES. INVENTOR.
C. T. Hannigan. Otto Miller.
Henry P. Stowe. By Geo. H. Remington.
Atty.

UNITED STATES PATENT OFFICE.

OTTO MILLER, OF PROVIDENCE, RHODE ISLAND.

FISHING-GEAR.

No. 800,001.      Specification of Letters Patent.      Patented Sept. 19, 1905.

Application filed November 3, 1904. Serial No. 231,226.

*To all whom it may concern:*

Be it known that I, OTTO MILLER, a citizen of the United States of America, and a resident of Providence, in the county of Providence and State of Rhode Island, have invented certain new and useful Improvements in Fishing-Gear, of which the following is a specification.

My invention relates to new and novel improvements in fishing-gear or fish-hooks and of the type or class in which an auxiliary hook is used to further insure or assist the companion or bait hook in holding or securing the fish. It has been usual heretofore in this class of fish-hooks to provide them with a leader, pull-rod, or analogous device, to which the cord or line is secured, the hooks themselves being indirectly connected to said device. In some cases the auxiliary hooks form traps or gaffs arranged when tripped to close down upon the fish. In another case the movable hook is actuated by a slidable "fly-carrying" sleeve mounted on the shank of the bait-hook.

My invention differs from former fish-hooks or fishing-gear from the fact that each hook is capable of independent movement; and it consists, essentially, of a pair of normally locked or closed hooks, one of which is or may be secured to the line, and means connected with both hooks arranged to be automatically released or unlocked by a pull upon the other or bait hook, the result being to swing or swivel the line-connected hook axially, thereby opening or separating them, and thus forming when in use additional holding means for preventing the escape of the hooked fish.

It is well known that certain kinds of fish having large mouths—as, for example, seatrout or weakfish, &c.—are quite liable to escape after being hooked, even when great skill is used by the fisherman to prevent it. Such loss is mainly due to the fact that the fish have very "tender" mouths, from which the hook is easily torn.

The object I have in view is to produce a fishing-gear well adapted to be used for catching fish of the kind just referred to, the device being brought into play by the fish itself—that is to say, the action of the fish upon striking the bait-hook instantly releases or unlocks the other or spring-pressed auxiliary hook, the axial movement of the latter thereby separating the point portions of the hooks and at the same time causing the auxiliary hook to pierce the fish. The device is comparatively inexpensive to manufacture, it is quick and positive in its action, it is not liable to get out of order or repair, and is strong yet light and simple.

In lieu of a metal spring for opening the hooks I prefer to use an ordinary rubber band or connection, the same being practically unaffected by water. In case the band becomes worn out or broken it can be instantly replaced by a new one. The other parts of the gear are made of suitable metal.

In the accompanying sheet of drawings, Figure 1 is a front elevation representing my improved fishing-gear in the normal operative position as in use, the bait being omitted. Fig. 2 is a corresponding side or edge view. Fig. 3 shows the opposite or rear face of the device in elevation. Fig. 4 is a front view similar to Fig. 1, but showing the relation of the parts when unlocked. It is in this position that its greatest efficiency is attained. Fig. 5 is an inverted horizontal cross-sectional view, enlarged, taken on line *x x* of Fig. 1. Fig. 6 is a detail front view of the base or holder member, also enlarged; and Fig. 7 is a detail perspective view of the rubber band normally contracted, enlarged.

In my improved fishing-gear or duplex fish-hook device A, I may use any suitable or well-known hooks, as *a* and *b*. I prefer to make one hook somewhat longer than the other, the shanks thereof being superposed or parallel, as shown—that is to say, the point portion of the rear or bait hook *b*, as drawn, extends above that of the other or front hook *a* a short distance—say one-quarter of an inch—substantially as shown in Figs. 1, 2, and 3.

The upper portion of the device consists of the washer-like base or holder *c*, which carries or supports the hooks. The front and rear sides or faces of the holder are provided with oppositely-disposed integral bearings $c'$ $c^2$, respectively. A short stem $a'$ extends longitudinally through the front bearings $c'$, its lower portion being secured to a sleeve or collar *f*, the opposite or upper end being fast to the shank of an eye member *m*, to which latter the line *l* may be directly attached. The hook *a* is also secured to the sleeve *f*, all as clearly shown. As thus arranged, the said members *a a'* and *m* are practically integral and adapted to turn or swivel in the bearings $c'$, but are prevented from endwise movement. The rear or bait hook *b* is similarly mounted in the holder $c$—that is to say, a stem $b'$ extends through the bearings $c^2$, its lower portion being secured to a collar $f''$, to which latter the shank of hook $b$ is also secured. A collar $b^2$, secured to the upper end of said stem, serves as a stop for limiting downwardly the longitudinal or endwise movement of the bait-hook. This hook I prefer to make somewhat shorter than the other or auxiliary hook $a$, as clearly shown.

In order to provide means for locking the hooks and maintaining them in the normally closed position (shown in Figs. 1, 2, and 3) until released by a pull upon the short or bait hook $b$, the front hook $a$, or, as drawn, the stem portion $a'$ of it, has an arm or horizontal lever $h$ rigidly secured thereto, the same extending transversely across and beyond the holder $c$ and terminating at the free end in an eye $h'$ and a lug or ear $h^2$. (See Fig. 5.) To the other hook or stem $b'$ thereof is secured a bar $n$. This latter is oppositely disposed to the said arm $h$ and is non-revoluble by reason of its engagement with the adjacent face of the holder. One end of the bar is reduced and forms a short upwardly-bent hook or catch $n'$, adapted to freely enter said eye $h'$ of the other member $h$.

It is apparent that means must be provided for maintaining the members $h$ and $n$ in the normally locked position when in use until released or unlocked by a pull upon the bait-hook. For this purpose I prefer, as hereinbefore stated, to employ an elastic or rubber band $r$, the same being attached to said lug $h^2$ of arm $h$ and to a lug or loop $c^3$ of the holder $c$. As thus arranged, it is clear that the tension of the band positively prevents the members from being accidentally disconnected or unlocked. When, however, sufficient pull or stress is applied to the bait-hook $b$, the latter is drawn downwardly until arrested, say, by the engagement of the upper collar $b^2$ with the holder $c$, thereby at the same time or instant freeing the catch $n'$ from the arm $h$, the reaction of the elastic connection $r$ immediately swinging the arm, &c., axially about one hundred and eighty degrees, (see dotted-line position, Fig. 5,) thus opening the hooks. (See also Fig. 4.)

I may add that by making the bait-hook $b$ endwise movable and shorter than the axially-movable fellow-hook $a$ the fish upon striking the bait will pull with sufficient force to retract the hook (see arrow direction, Fig. 1) and release the locking device, it being assumed, of course, that the line $l$ is held by the fisherman or is otherwise secured.

While the drawings illustrate what I now consider to be the best form and arrangement of the parts comprising my improved fishing-gear A, I do not desire to be understood as limiting myself to the specific construction of the mechanism set forth, since the same may be altered or modified without departing from or varying the spirit of the invention.

Having thus described my invention, what I claim as new, and desire to secure by United States Letters Patent, is—

1. As a new article of manufacture, a fishing-gear having a pair of independently-movable hooks, one being a bait-hook and the other an auxiliary hook, means for securing the hooks together in a locked and substantially parallel normal position, and a device for swinging or turning said auxiliary hook on its longitudinal axis after it is released or unlocked by a pull upon the bait-hook.

2. A fishing-gear device consisting of a base or holder member located at the upper portion of said device, a pair of normally parallel hooks movably mounted in and supported by said holder, one of the hooks arranged to be secured to a fish-line the other being the bait-hook, a pair of arms or catch members secured to the shank portion of the hooks and a spring for maintaining said arms in the normally locked position, whereby an endwise pull upon the bait-hook releases or unlocks the arms and allows the spring to swing the other hook around to its limit.

3. In a fishing-gear, a suitably-mounted bait-hook capable of a short longitudinal movement and a swinging fellow or auxiliary hook arranged substantially parallel with the bait-hook, the combination therewith of arms or locking members secured to said hooks, and an elastic connection both for holding said arms in the normally locked position and also for swinging the bent portion of the auxiliary hook away from the corresponding part of the bait-hook when the latter is unlocked by a downward pull upon it.

4. In a fishing-gear, the combination of the normally stationary base or holder member $c$ having suitably-disposed bearings, $c'$, $c^2$, formed on its front and rear sides, a bait-hook $b$ having a limited longitudinal movement mounted and supported in said bearings $c^2$, an arm $n$ secured to the shank of said hook, an auxiliary hook $a$ mounted and supported in the bearings $c'$, an arm $h$ secured to the shank of the last-named hook and in normal engagement with the other arm to form a locking device, and a yielding or resilient connection $r$ attached to said holder and to the arm member $h$, whereby upon depressing the bait-hook the arms become unlocked or disengaged and the connection $r$ turns or swings the other hook around from the normal position, substantially as hereinbefore described and for the purpose set forth.

Signed at Providence, Rhode Island, this 1st day of November, 1904.

OTTO MILLER.

Witnesses:
GEO. H. REMINGTON,
HENRY P. STONE.